March 11, 1947.  L. M. BACH  2,417,342
COMBINED DROP TANK AND DEMOLITION BOMB
Filed April 15, 1943
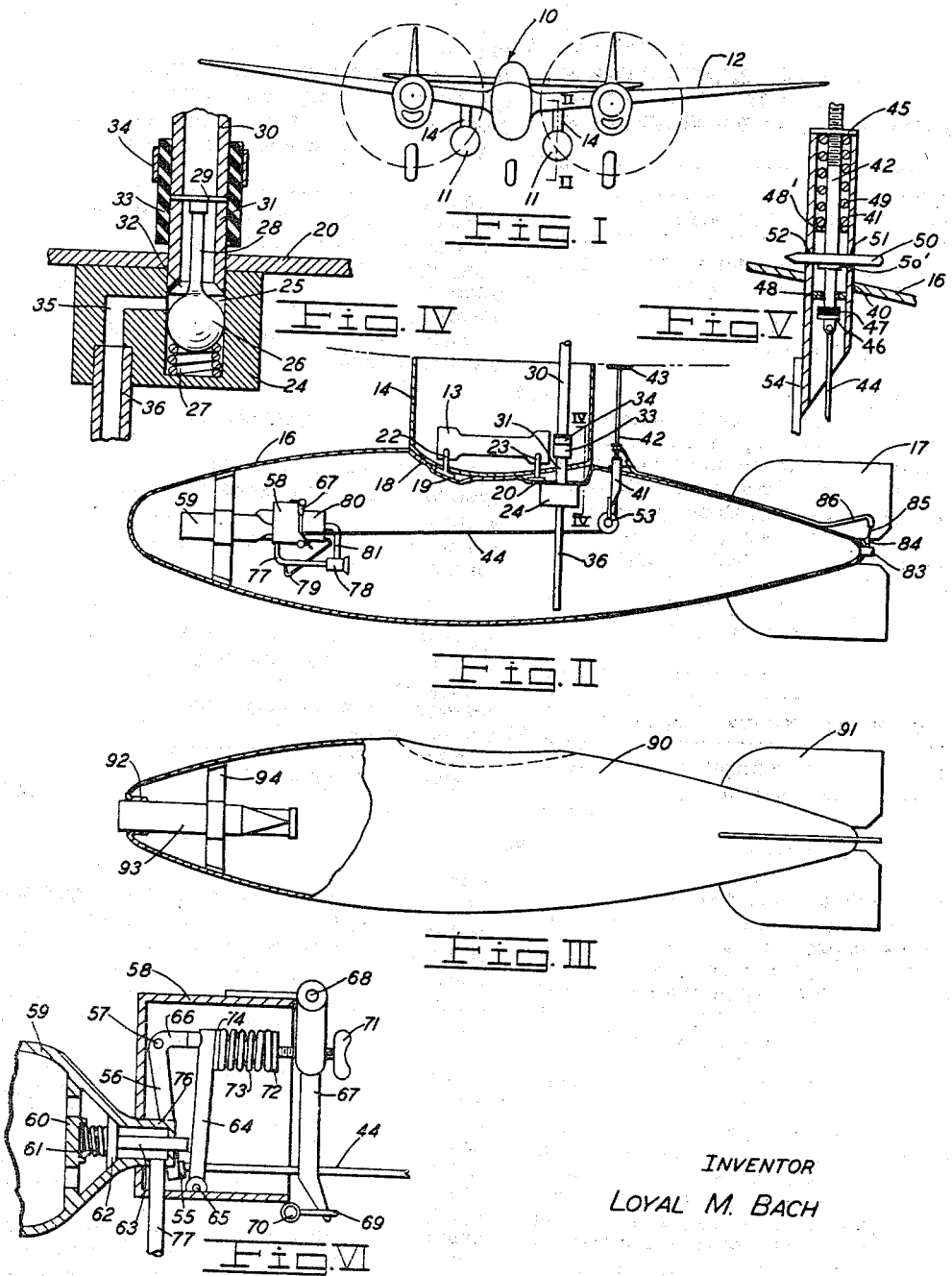
INVENTOR
LOYAL M. BACH Patented Mar. 11, 1947

2,417,342

UNITED STATES PATENT OFFICE 2,417,342

COMBINED DROP TANK AND DEMOLITION BOMB

Loyal M. Bach, Burbank, Calif., assignor, by mesne assignments, to Lockheed Aircraft Corporation, a corporation of California Application April 15, 1943, Serial No. 483,219

4 Claims. (Cl. 102—2)

This invention relates to a combined gas tank and demolition bomb and more particularly to a combined gas tank and demolition bomb that is adapted to be released and dropped from an aircraft.

It is very often necessary, especially on long range flights, for an aircraft to carry an additional supply of gasoline to that normally required. This gasoline is generally carried in additional tanks on the outside of the aircraft, or, more particularly, for convenience and aerodynamic reasons, may be attached to the lower surface of the wing section. Upon arriving at his destination or entering into active combat, the pilot may, at his option, release these tanks, thus reducing the load and drag factor on the aircraft. Therefore, I provide as the main object of my invention a novel means to utilize the aforesaid tanks when they have been emptied and released from an aircraft.

Another object of this invention is to provide a novel means to completely seal a droppable gasoline tank after disengagement from an aircraft.

Another object of this invention is to provide a novel means to discharge an explosive liquid or gas into the interior of a gasoline tank.

Another object of this invention is to provide a novel means to actuate a liquid or gasoline discharging unit and simultaneously extract a safety pin from a detonator or fuse in the tank.

Other and further important objects of this invention will be apparent from the disclosures in the specification and the accompanying drawings.

This invention in its preferred form is illustrated in the drawings and hereinafter more fully described.

On the drawings:

Figure I is a front view of an aircraft showing the combined droppable gasoline tank and demolition bomb in position.

Figure II is a sectional view taken along line II—II in Figure I and illustrating the preferred embodiment of my invention.

Figure III is a partial sectional view similar to Figure II and showing an alternate arrangement of my invention.

Figure IV is a sectional detail taken on line IV—IV in Figure II and illustrating a method of sealing the tank upon removal of a gasoline feed line.

Figure V is a sectional detail showing a method of actuating a control mechanism for charging and arming an explosive gasoline tank.

Figure VI is a sectional detail of a release mechanism of a charging unit.

As shown—

Referring to Figure I, I show a conventional aircraft indicated generally at 10 and being equipped with a pair of droppable gasoline tanks 11 supported on the lower side of the wings 12 by bomb shackles indicated generally at 13 (see Figure II), enclosed in airfoil-shaped fairings 14. The tank 11 consists of a substantially tear drop shaped outer skin 16, upon the rear end of which is attached a plurality of equally spaced fins 17. A depression 18 provided in the upper surface of skin 16 is adapted to receive the fairing 14 and has flat portions 19 and 20 that support brackets 22 and 23 which engage the bomb shackle 13, which is adapted to retain the tank in a locked position until it is released by any suitable means (not shown) that may be conveniently located in the cockpit.

Mounted on the lower face of the flat portion 20, I provide a valve body 24 which contains a valve chamber 25 therein. A sealing ball 26 is arranged within hole 25 and is adapted to be urged upwardly by spring 27 in the bottom of the hole 25. One side of the ball 26 is provided with a shaft 28, the upper end of which is held in place by a member 29 placed intermediate a pair of tubes 30 and 31, but not blocking the passageway therethrough. Tube 30 extends upwardly through the fairing 14 and the wing 12 to the engine, and tube 31 extends downwardly through the flat portion 20 to communicate with the upper portion of the chamber 25 and has a beveled portion 32 on its lower end, forming a seat for the ball 26. I provide a hose connector 33 embracing the tubes 30 and 31 and the rectangular member 29, which is adapted to be clamped to tube 30 by a circular clamp 34. This hose connection is pulled off the lower tube 31 when the tank is released, thus allowing the ball 26 to seat against the lower end of the tube 31. Adjoining the valve chamber 25 intermediate the ball 26 and the beveled portion 32 of the tube 31, I provide a fuel passage 35 which extends outwardly then downwardly and is joined by a suction tube 36 which in turn extends downwardly to the lower portion of the tank 11 and is adapted to draw gasoline from the tank for delivery to the engine.

Intermediate the fairing 14 and the fins 17, and rigidly mounted in hole 40 in skin 16 (see Figure V), I provide a charging control mechanism which consists of a tubular jacket member 41 which encloses an actuating rod 42, the upper end of which has a plate 43 which is adapted to engage the lower surface of the aircraft wing 12, and the lower end forms an attachment for a control cable 44. A washer 45 engages rod 42 at a point approximately level with the top surface of jacket 41 and is adapted to act as a stop against said jacket top. Also inside jacket 41, and mounted on rod 42, I have arranged a seal support washer 46 which supports a sealing gland 47. An internal shoulder 48 in the jacket 41 is provided slightly above the sealing gland 47 to act as a stop and sealing member for said sealing gland. A second internal shoulder 48' of the jacket 41 supports the lower end of a compression spring 49, its upper end being adapted to normally urge stop washer 45 in an upwardly direction. With the tank in place on the airplane this arrangement forms a vent for the tank, which vent is closed by the operation of the changing control mechanism. A U-shaped safety pin 50 arranged in aligned holes 51 and 52 in jacket 41 straddles and retains the rod 42 in its lowered position by acting against the upper surface of a washer 50' mounted on rod 42.

A pulley 53 journaled in bracket 54 mounted on the lower end of jacket 41 serves to form a turning point for control cable 44, the lower end of which is fastened at 55 to a trigger member 56 (see Figure VI), which is pivotally mounted as at 57 in a box member 58 of an oxygen discharging valve mechanism.

The oxygen discharging apparatus consists of an oxygen bottle 59 supported by any suitable means in the interior of tank 11 and having an inside perforated web 60 that supports a compression spring 61 that normally urges a valve member 62 to a closed position. The valve 62 has a stem 63 that is adapted to rest against an arm 64 which is pivotally mounted at 65 to one side of box 58 and has its other end notched to receive a catch arm 66 of the trigger member 56. A loading lever 67, pivotally mounted at 68 over the open end of box 58 and having its free end supported by a catch member 69, pivotally mounted at 70, supports a thumb screw 71 which engages a spring support plate 72 of a compression spring 73, the other end of which is supported by spring plate 74 fastened to arm 64.

The discharge end of oxygen bottle 59 has an elongated end 76 into which is connected an oxygen outlet line 77 which is connected to a spray nozzle 78 (see Figure II). A pressure line 79, leading from line 77 supplies pressure to a gasoline bottle 80, which in turn forces gasoline through line 81 and into the spray nozzle 78 to be mixed with the oxygen from bottle 59 through line 77, to be then sprayed into the tank 11, to insure the presence of an explosive mixture of gasoline and oxygen in the tank at the time the detonation is set off.

A fuse or detonator 83, such as a blank cartridge and firing pin therefor (not shown), which is adapted to ignite the gaseous mixture in the tank upon being jolted, has a safety pin 84 that is adapted to be extracted by a cable 85, running through conduit 86 along the upper surface of the tank 11 and being attached to rod 42, when said rod is actuated in the manner heretofore described. Various other types of detonators or fuses are available which are armed or rendered live by the removal of a safety pin or the like.

Thus it will be seen that having removed safety pin 50, after installation of the tank on the aircraft, and having used most of the gasoline in the tank, the tank becomes a potential bomb and may be dropped at the pilot's convenience. Upon dropping the tank, it is simultaneously sealed, the detonator placed in its firing position and the tank filled with an explosive gaseous mixture of oxygen and gasoline.

When the tank is released by the bomb shackle 13, the gas line 30, being rigidly mounted in the aircraft, together with the hose 33 and clamp 34, is pulled away from the tube 31, thus allowing the ball 26 to seat against the bevel 32 thereby sealing the gasoline outlet. The shaft 42, no longer held in its downward position by the wing 12, is urged sharply upward by the spring 49 and allows the sealing gland 47 to come in contact with the internal shoulder 48, thus sealing this normal vent opening and also actuating trigger arm 56 in the oxygen release valve mechanism by means of cable 44. The catch arm 66 slips from the notch in the arm 64, allowing arm 64 to be depressed by spring 73, and thus depressing valve 62, allowing the oxygen to flow through tube 77 and 79 and forcing the gasoline in bottle 80 through line 81 and into the spray nozzle 78 to be discharged in the form of a spray into the interior of the tank. The detonator arming cable 85 being directly connected to the rod 42, is also actuated at the same time.

When the tank strikes a solid object such as the earth, the blank cartridge is fired in the detonator 83, thus igniting the explosive mixture and exploding the tank, tending to spray any residual gasoline over a wide area.

Referring to Figure III, I have shown an alternate arrangement of my invention in which I provide a tank 90, similar to that previously described, with fins 91 on its aft section. This modification may use the pump and vent seals previously described if so desired, it being understood that pump and vent provisions are necessary parts of such droppable tanks. The forward end of tank 90 is crimped in as at 92 to support the forward end of an incendiary bomb 93, its aft end being supported by a bracket 94 spanning the sides of the tank. This arrangement is more particularly adapted to be dropped with a partially full tank of gasoline, whereby the gasoline is ignited by the incendiary bomb and is sprayed over surrounding objects by the bursting of the tank upon impact.

Having thus described my invention and the present preferred embodiments thereof, I desire to emphasize the fact that many modifications may be resorted to in a manner limited only by a just interpretation of the following claims.

I claim as my invention:

1. In a droppable fuel tank for aircraft, including normally open fuel pumping and venting connections thereto, means for sealing said pumping and venting connections, upon the release of said tank, means for discharging an explosive mixture into said tank including containers for explosive materials, and valved means therefor, and means connecting said valved means to said sealing means, said connecting means being so constructed and arranged as to release said valved means upon the operation of the sealing means.

2. In a droppable fuel tank for aircraft, including normally open fuel pumping and venting connections thereto, means for sealing said pumping and venting connections upon the release of said tank, means for discharging an explosive mixture into said tank including containers for explosive materials, and valved means therefor, means connecting said valved means to said sealing means, said connecting means being so constructed and arranged as to release said valved means upon the operation of the sealing means, a detonator carried by said tank, and means connected to the vent seal and operable by the closure of said vent to arm said detonator.

3. In a droppable fuel tank for aircraft, including normally open fuel pumping and venting connections thereto, means for sealing said pumping and venting connections upon the release of said tank, a detonator carried by said tank, and means connected to the vent seal and operable by the closure of said vent to arm said detonator.

4. In combination with a droppable fuel tank for aircraft, wherein the tank is provided with a detachable fuel line for removing fuel therefrom, and venting means to prevent air binding during such fuel removal, means to convert the residual fuel in said tank into an incendiary and explosive substance, comprising a detonator, and means adapted to seal the fuel line and venting means upon dropping said tank, whereby to retain the incendiary and explosive substance in the tank until the detonator is ignited.

LOYAL M. BACH.

REFERENCES CITED

The following references are of record in the file of this patent:

UNITED STATES PATENTS

| Number | Name | Date |
| --- | --- | --- |
| 325,538 | Hayes | Sept. 1, 1885 |
| 1,317,551 | Chambers | Sept. 30, 1919 |
| 2,323,303 | Bluehdorn et al. | July 6, 1943 |
| 2,069,996 | Carleton et al. | Feb. 9, 1937 |

FOREIGN PATENTS

| Number | Country | Date |
| --- | --- | --- |
| 217,878 | German | Jan. 18, 1910 |